US006582649B1

(12) United States Patent
Sano et al.

(10) Patent No.: US 6,582,649 B1
(45) Date of Patent: Jun. 24, 2003

(54) PARSION STABILIZING METHOD AND SYSTEM THEREFOR FOR BLOW-MOLDING MACHINE

(75) Inventors: Shigeaki Sano, Kanagawa (JP); Ken Nakao, Kanagawa (JP); Sohei Masaki, Kanagawa (JP); Kunihiro Hijikata, Kanagawa (JP)

(73) Assignee: The Japan Steel Works, Ltd., Tokyo (JP)

( * ) Notice: Subject to any disclaimer, the term of this patent is extended or adjusted under 35 U.S.C. 154(b) by 262 days.

(21) Appl. No.: 09/709,567

(22) Filed: Nov. 13, 2000

(30) Foreign Application Priority Data

Nov. 12, 1999 (JP) .......................................... 11-322672

(51) Int. Cl.[7] ......................... B29C 49/16; B29C 49/58; B29C 49/62

(52) U.S. Cl. ....................... 264/526; 264/529; 264/540; 425/530; 425/532; 425/535

(58) Field of Search ................................ 264/529, 526, 264/540; 425/530, 532, 535

(56) References Cited

U.S. PATENT DOCUMENTS 3,425,090 A * 2/1969 Nave et al. ................. 264/529
5,068,075 A * 11/1991 Dundas et al. .............. 264/526

FOREIGN PATENT DOCUMENTS

JP 62051425 A * 3/1987 ........... B29C/49/48
JP 06218800 A * 8/1994 ........... B29C/49/58
JP 06312448 A * 11/1994 ........... B29C/49/16
JP 07308960 A * 11/1995 ........... B29C/49/62
JP 08230023 A * 9/1996 ........... B29C/49/16

* cited by examiner

*Primary Examiner*—Robert Davis
(74) *Attorney, Agent, or Firm*—Sughrue Mion, PLLC

(57) ABSTRACT

A forced exhaust pipe is connected to an exhaust pipe connected with a cross head so that a negative pressure may be formed within an air passage so as to effect rapid control of air pressure (amount) within a parison, thereby stabilizing the air pressure within the parison. A parison stabilizing method and a system therefor for use in a hollow formation molding machine, according to the present invention, are so formed that a forced air-discharge is carried out through an exhaust pipe connected with the air passage formed within the cross head, so that a negative pressure is formed within the air passage. In this way, the above-mentioned system can effect quick control of an air pressure (amount) within the prison during a pre-blowing treatment, shorten a time period necessary for determining molding conditions, without having to increase the inner diameter of the air passage.

2 Claims, 3 Drawing Sheets

PARSION STABILIZING METHOD AND SYSTEM THEREFOR FOR BLOW-MOLDING MACHINE

BACKGROUND OF THE INVENTION

1. Field of the Invention

The present invention relates to a parison stabilizing method and to a system therefor for blow-molding machines. In particular, this invention relates to an improvement which requires that a metal mold at the final stage of a pre-blowing treatment is closed continuously, the pressure in an air passage within a cross head is made negative to quickly expel an excess of air from an external parison located on the outside of the metal mold, so as to control an air pressure (amount) within the parison during the pre-blowing treatment, thus stabilizing the shape of the parison.

2. Description of the Related Art

FIG. 1 shows an example of a conventional blow-molding machine.

In FIG. 1, reference numeral 1 represents a cross head which is connected with an extruder 2. Specifically, the cross head 1 is formed with a melted resin flowing passage 3 having a cylindrical shape.

An air passage 4 is formed through the above cross head 1 and is disposed along the axial line thereof. Connected with the air passage 4 is an exhaust pipe (for releasing air) 6 having an exhaust valve 5. The exhaust pipe 6 is connected with a pre-blow pipe 9 which has a pre-blow valve 7 and is connected with an air source 8 (3 to 10 kg/cm$^2$) located in a plant.

Under the cross head 1, there are provided a parison cutting device 10, a freely openable/closable metal mold 11, and a pre-pinch device 12, disposed independently from one another, thereby forming a multi-stage arrangement.

The operation of the hollow formation molding machine is described in the following. First, the melted resin extruded out of the extruder 2 is caused to move through the melted resin flowing passage 3 and is further extruded downwardly from an outlet opening 3*a* so as to form a cylindrical parison 20. Then, the cylindrical parison 20 is caused to pass through a metal mold 11 and thus arrive at a pre-pinch device 12. In this way, with the lower end of the cylindrical parison 20 being pinched by the pre-pinch device 12, the metal mold 11 is continuously maintained at its half-closed state, while the pre-blow valve 7 is opened and the exhaust valve 5 is closed, so that the air is supplied into the parison 20, thus carrying out a pre-blowing treatment.

Once the pre-blowing treatment is finished, the metal mold 11 is closed completely, and the external parison 20*a* extending on the outside of the metal mold 11 is cut by a parison cutting device 10. In a subsequent step, an air nozzle (not shown) is forced into the parison 20 so as to perform a blow forming treatment. That is, a pre-blowing treatment is carried out and thus the parison is pre-expanded. Then, under the conditions, the metal mold 11 is closed completely so as to carry out a predetermined main blowing treatment.

However, since the conventional blow-molding machine is constructed in the above-described manner, there have been the following problems.

That is, at the time the above pre-blowing treatment is being carried out, there will be an excessive amount of air due to the relationship between an introduced air amount and the volume of a cavity formed within the metal mold 11. In fact, such an excess of air will cause the external parison 20*a* to expand. Furthermore, since it is necessary to perform a puncture, such a puncture will cause unstable molding conditions when forming the parison 20 in the metal mold 11.

At this time, the exhaust valve 5 is opened so that the air is allowed to escape to the outside. Alternatively, the parison is made to expand actively so as to effect the same puncture. In the former case, if the inner diameter of the air passage 4 within the cross head 1 is increased, the air release can be performed smoothly. However, since the outer diameter of the cross head 1 will also have to become large, it is difficult to produce a final product which will satisfy the needs of users. Moreover, there has been a problem in that if the external parison receives a puncture, the parison will be undesirably wound around an take-out device used in a subsequent step.

As a result, in each of the above-mentioned cases, a considerable amount of time is needed to determine various molding conditions until the molding conditions have become stabilized.

SUMMARY OF THE INVENTION

The present invention has been accomplished in order to solve the above problems, and it is an object thereof to provide a parison stabilizing method and a system therefor for use in a hollow formation molding machine, which method requires that when a metal mold at the final stage of a pre-blowing treatment is being closed continuously, the pressure in an air passage within a cross head is made negative to quickly expel an excess of air from an external parison located on the outside of the metal mold, so as to control an air pressure (amount) within the parison during the pre-blowing treatment, thus stabilizing the shape of the parison.

The parison stabilizing method according to the present invention is for use in a blow-molding machine which is formed such that after a parison extruded out of a cross head has been introduced into a metal mold, an amount of air is supplied thereto by way of an air passage formed within the cross head to cause the parison to expand, characterized in that the air amount within the parison is controlled by forming a negative pressure within the air passage in the cross head. Furthermore, the parison stabilizing method according to the present invention is characterized in that a forced exhaust pipe is provided outwardly of an exhaust valve of an exhaust pipe which is connected with the air passage, a negative pressure is formed within the air passage by discharging the air through the forced exhaust pipe under a condition in which the exhaust valve is in the open position. Moreover, there is provided a parison stabilizing system which is for use in a blow-molding machine formed such that after a parison extruded out of a cross head has been introduced into a metal mold, an amount of air is supplied thereto by way of an air passage formed within the cross head to cause the parison to expand. The parison stabilizing system comprises an exhaust pipe connected with the air passage and having an exhaust valve; a pre-blow pipe connected between the exhaust valve and the air passage and is further connected to an air source through a pre-blow valve; and a forced exhaust pipe, with one end thereof being connected on the downstream side of the exhaust valve of the exhaust pipe and the other end thereof being connected to the air source. Specifically, a negative pressure is formed within the air passage by at first closing the exhaust valve and the forced exhaust valve, opening the pre-blow valve to perform a pre-blowing treatment in the parison, followed by opening the exhaust valve and the forced exhaust valve, and closing the pre-blow valve so as to cause the air to move to the forced exhaust pipe.

DESCRIPTION OF THE PREFERRED EMBODIMENTS

Figure 1:
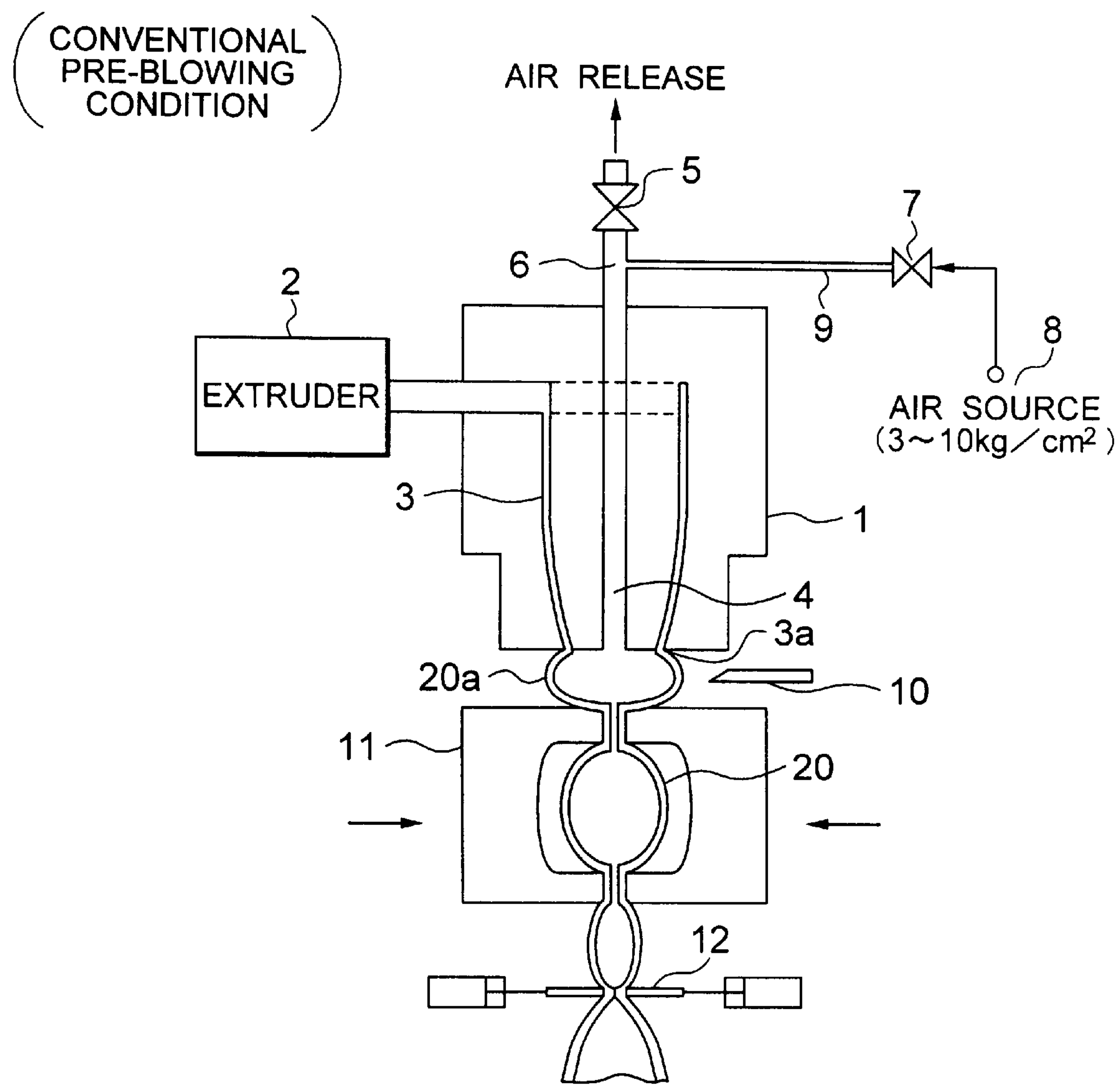
FIG. 1 is an explanatory view showing a conventional blow-molding machine in which a pre-blowing treatment has arrived at its final stage and its metal mold is in its closed position.

In the following, with reference to the accompanying drawings, the present invention will be described in detail by showing preferred embodiments of the parison stabilizing method and the system therefor for use in a hollow formation molding machine.

However, members or elements identical with or similar to those in the above-described conventional art will be represented by the same reference numerals for explanation.

Figure 2:
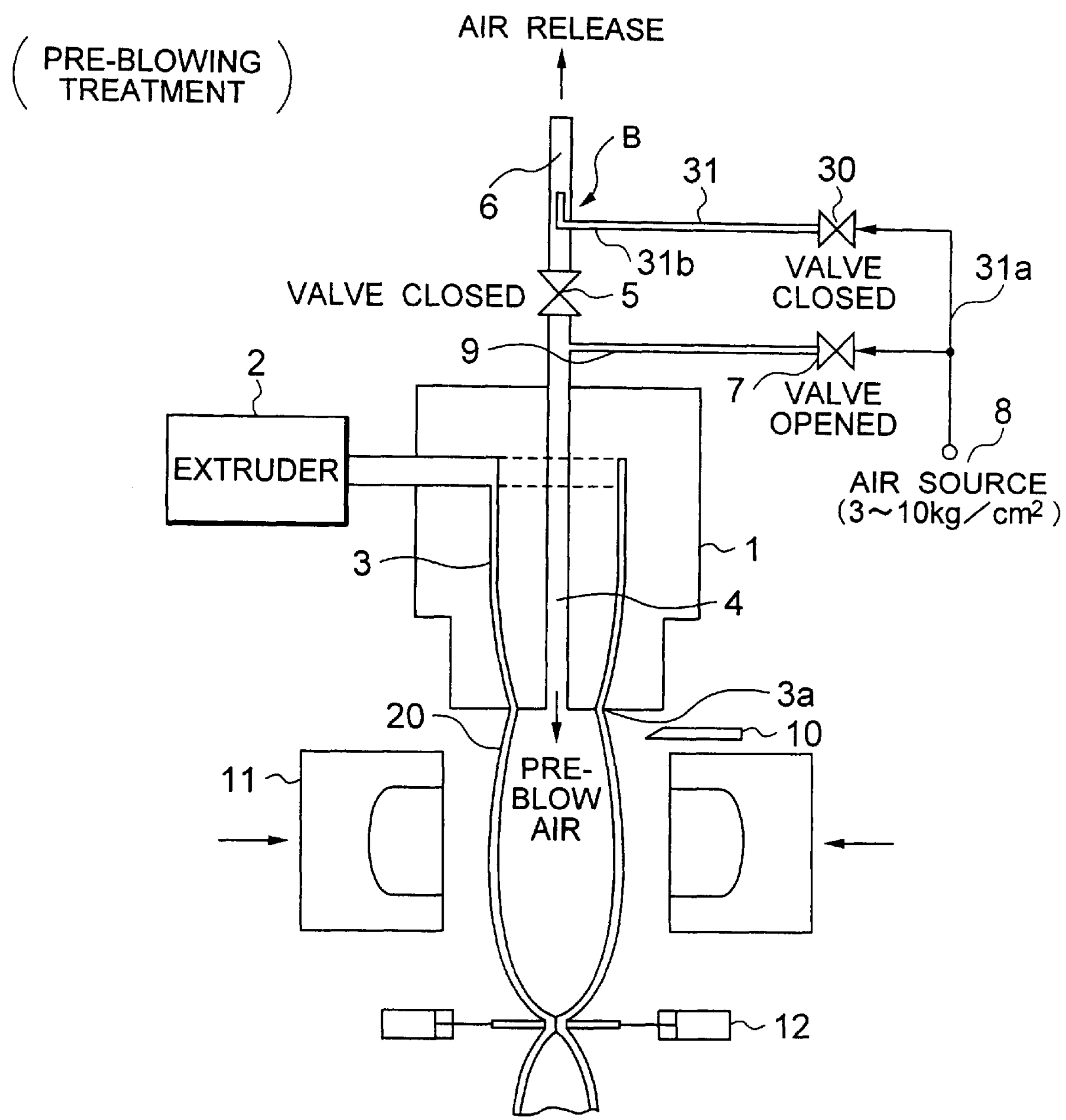
FIG. 2 is an explanatory view showing a pre-blowing state in a blow-molding machine according to the present invention.

In FIG. 2, reference numeral 1 represents a cross head connected with an extruder 2. A melted resin flowing passage 3 having a cylindrical shape is formed within the cross head 1.

Moreover, an air passage 4 is formed through the cross head 1 along the axial center line thereof. Connected with the air passage 4 is an exhaust pipe 6 having an exhaust valve 5. The exhaust pipe 6 is connected with a pre-blow pipe 9 which has a pre-blow valve 7 and is connected with an air source 8 (3 to 10 $kg/cm^2$) located in a plant.

Furthermore, there is provided a forced exhaust pipe 31 having a forced exhaust valve 30. Specifically, one end 31*a* of the forced exhaust pipe 31 is connected to the air source 8, and the other end 31*b* thereof is positioned within the exhaust pipe 6 in a manner such that this end is coaxial with the pipe 6.

Under the above cross head 1 there are provided a parison cutting device 10, a freely openable/closable metal mold 11, a pre-pinch device 12, disposed independently from one another, thus forming a multi-stage arrangement.

The operation of the hollow formation molding machine may be described in the following. First, the melted resin extruded out of the extruder 2 is caused to move through the melted resin flowing passage 3 and is further extruded downwardly through an outlet opening 3*a* so as to form a cylindrical parison 20. Then, the cylindrical parison 20 is caused to extend, passing through the metal mold 11 and thus arriving at a pre-pinch device 12. In this way, with the lower end of the cylindrical parison 20 being pinched by the pre-pinch device 12, the pre-blow treatment is conducted in a manner shown in FIG. 2.

In the pre-blowing treatment shown in FIG. 2, the forced exhaust valve 30 and the exhaust valve 5 are closed so that the air is supplied to the air passage through the pre-blow pipe 9. Then, under a condition where the metal mold 11 has been opened, the parison 20 is caused to expand.

Figure 3:
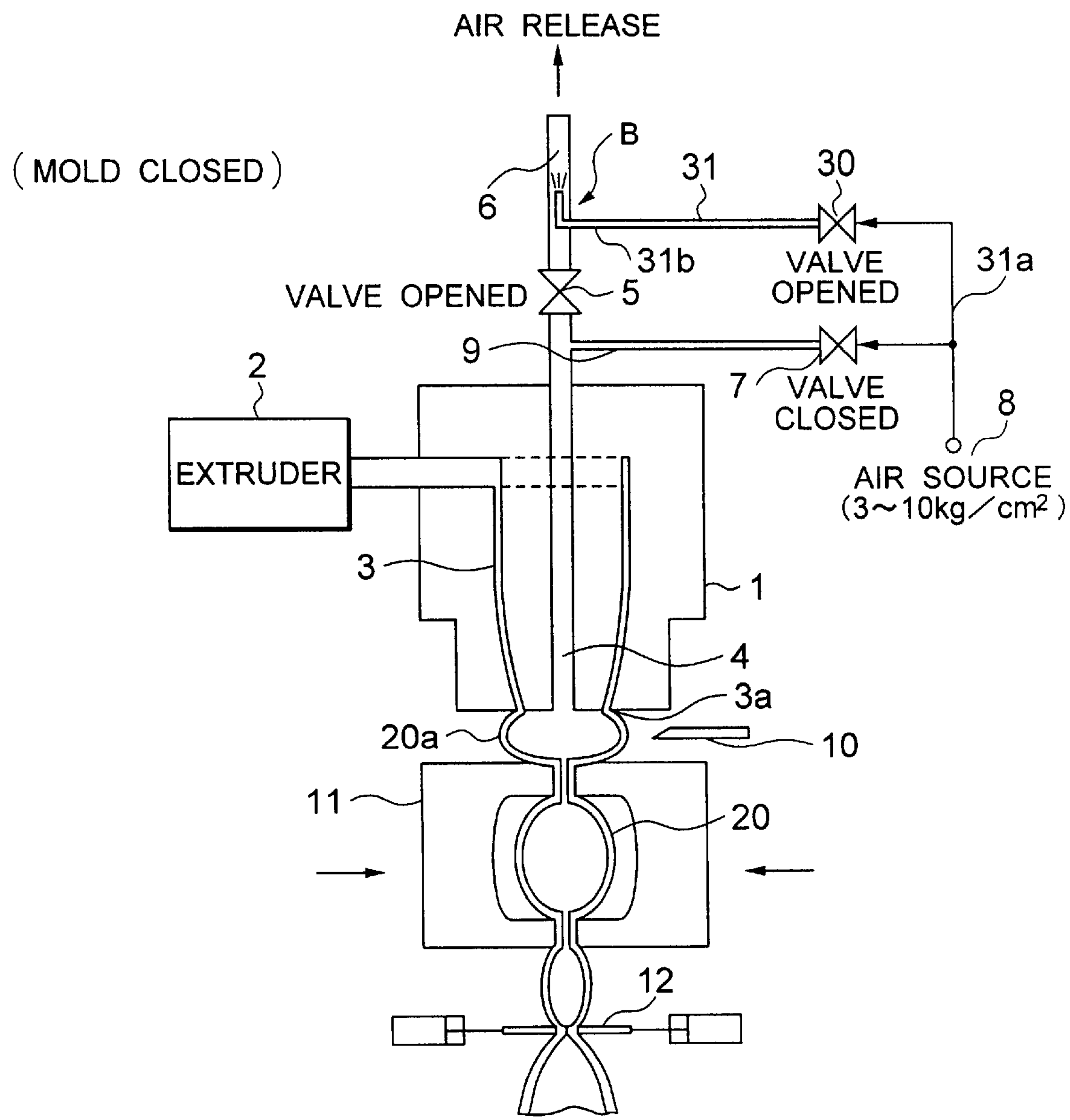
FIG. 3 is an explanatory view showing a condition in which the pre-blowing treatment shown in FIG. 2 has reached the final stage and the metal mold is closed.

Afterwards, as shown in FIG. 3, in the final stage of the pre-blowing treatment during which the metal mold 11 is closed continuously and the pre-blowing treatment is carried out in the parison 20, when the forced exhaust valve 30 and the exhaust valve 5 are opened while the pre-blow valve 7 is closed, the pre-blowing treatment can be changed over to an air-releasing process. At this time, by virtue of a cooperation with the forced exhaust pipe 31, a Venturi effect occurs at a Venturi-effect position B in the exhaust pipe 6, so that the internal pressure within the air passage 4 becomes negative. As a result, an excess of air within the expanded external parison 20*a* is allowed to quickly escape therefrom, thereby eliminating the expanded portions, thus effecting a desired control capable of stabilizing the air within the parison 20 in the metal mold 11.

Here, by means of control devices (not shown), the opening and closing operations of the above valves 5, 7, and 30 are interlocked with the operations of the extruder 2 and the metal mold 11, rendering it possible to control the supply of the air, to control the negative pressure within the air passage, and to control various operational timings.

Furthermore, after the above pre-blowing treatment has been completed and the metal mold 11 has been closed completely, the external parison 20*a* is cut by the parison cutting device 10. Then, an air nozzle (not shown) is forced into the metal mold 11 so as to carry out a blow-molding process. Here, as means for forming a negative pressure within the air passage 4, it is not absolutely necessary to use a system including the above valves 5, 7 and 30. In fact, it is also possible to form a system using the above control devices to effect an On/Off control on a forced air-discharge means such as an air discharge fan which is directly connected with the exhaust pipe 6, thereby obtaining the same effect.

Since the parison stabilizing method and the system therefor for use in a hollow formation molding machine, has been constructed in the above-described manner according to the present invention, it is possible to obtain the following effect.

That is, since the forced exhaust pipe is connected with the exhaust pipe which is connected with the air passage formed within the cross head, the internal pressure of the air passage can be made negative by performing a forced air release at the final stage of the pre-blowing treatment, ensuring an exact and easy control for quickly reducing the air pressure (amount) within the parison. As a result, it is possible to greatly reduce the so-called preparation time in the manufacturing process, which is usually necessary for determining various conditions for the molding process. For example, a time period of about 10 hours for determining molding conditions in the conventional art may be reduced to about 5 hours.

Furthermore, the air release may be performed rapidly and sufficiently without the necessity of increasing the inner diameter of the air passage of the cross head, thereby allowing the cross head to be compact.

What is claimed is:

1. A parison stabilizing method for use in a hollow formation molding machine which is formed such that after a parison extruded out of a cross head has been introduced into a metal mold, an amount of air is supplied thereto by way of an air passage formed within the cross head to cause the parison to expand, characterized in that the amount of air within the parison is controlled by forming a negative pressure within the air passage in the cross head, wherein a forced exhaust pipe is provided outwardly of an exhaust valve of an exhaust pipe which is connected with the air passage, and a negative pressure is formed within the air passage by discharging the air through the forced exhaust pipe when the exhaust valve is in its opened position.

2. A parison stabilizing system for use in a hollow formation molding machine which is formed such that after a parison extruded out of a cross head has been introduced into a metal mold, an amount of air is supplied thereto by way of an air passage formed within the cross head to cause the parison to expand, said parison stabilizing system comprising:

an exhaust pipe connected with the air passage and having an exhaust valve;

a pre-blow pipe connected between the exhaust valve and the air passage and is further connected to an air source through a pre-blow valve; and a forced exhaust pipe, with one end thereof being connected on the downstream side of the exhaust valve of the exhaust pipe and the other end thereof being connected to the air source, and having a forced exhaust valve, wherein a negative pressure is formed within the air passage by first closing the exhaust valve and the forced exhaust valve, opening the pre-blow valve to perform a pre-blowing treatment in the parison, followed by opening the exhaust valve and the forced exhaust valve, and closing the pre-blow valve, so as to cause the air to move to the forced exhaust pipe.

* * * * *